United States Patent [19]

Correia et al.

[11] 3,876,713

[45] Apr. 8, 1975

[54] PROCESS FOR THE SIMULTANEOUS PREPARATION OF TETRACHLOROETHANES, TRICHLOROETHYLENE AND PENTACHLOROETHANE

[75] Inventors: Yves Correia; Jean-Claude Strini, both of Saint-Auban, France

[73] Assignee: Produits Chimiques Pechiney-Saint-Gobain, Neuilly-sur-Seine, France

[22] Filed: Mar. 17, 1972

[21] Appl. No.: 235,776

Related U.S. Application Data

[63] Continuation of Ser. No. 786,735, Dec. 24, 1968, abandoned.

[30] Foreign Application Priority Data

Dec. 29, 1967 France .............................. 67.134292

[52] U.S. Cl. ......................... 260/654 H; 260/658 R
[51] Int. Cl. ...................... C07c 21/10; C07c 17/00
[58] Field of Search ................... 260/658 R, 654 H

[56] References Cited

UNITED STATES PATENTS

| 2,318,323 | 5/1943 | Cunradi et al. ............... 260/654 H |
| 3,228,990 | 1/1966 | Vogt et al. ..................... 260/654 H |
| 3,475,504 | 10/1969 | Kircher et al. ................. 260/658 R |
| 3,637,875 | 1/1972 | Correia et al. ................ 260/658 R |

FOREIGN PATENTS OR APPLICATIONS

| 530,649 | 7/1931 | Germany ........................ 260/658 R |
| 1,817,191 | 8/1969 | Germany ........................ 260/658 R |
| 20,553 | 5/1963 | Japan ............................. 260/654 H |

OTHER PUBLICATIONS

Poutsma et al., J.A.C.S., 86, pp. 3807–3814, 1964.

*Primary Examiner*—Delbert E. Gantz
*Assistant Examiner*—Joseph A. Boska

[57] ABSTRACT

A process for the preparation of tetrachloroethanes, trichloroethylene and pentachloroethane by chlorination of dichloroethylenes in the presence of a catalyst but in the absence of light radiations.

12 Claims, No Drawings

PROCESS FOR THE SIMULTANEOUS PREPARATION OF TETRACHLOROETHANES, TRICHLOROETHYLENE AND PENTACHLOROETHANE

This is a continuation of application Ser. No. 786,735 filed Dec. 24, 1968 and now abandoned.

This invention relates to a process for the simultaneous preparation of tetrachloroethanes, trichloroethylene and pentachloroethane by chlorination of dichloroethylenes.

It is well known that the chlorination of dichloroethylenes in the presence of light and catalyst yields tetrachloroethanes.

As reported in the publication of M. L. Poutsma and R. L. Hinman, Journal of American Chemical Society, Vol. 86, page 3807 (1964), it is also known that at a temperature of 25°C, in the absence of light, dichloroethylenes remain stable over a long period of time and do not react with chlorine.

This invention is based on the unexpected discovery that the chlorination of dichloroethylenes to tetrachloroethanes can be carried out in the absence of light radiations and that commercially desirable yields of trichloroethylene and/or pentachloroethane can also be secured.

Thus it is an object of this invention to produce and to provide a method for producing tetrachloroethanes, trichloroethylene and pentachloroethane by chlorination of dichloroethylene and it is a related object to produce the compounds of the type described by the chlorination of dichloroethylenes in the absence of light radiations.

In accordance with the practice of this invention, dichloroethylenes in solution in a solvent are caused to react with molecular chlorine in the absence of light radiations but in the presence of a catalyst at a temperature within the range of 25° to 120° C and preferably within the range of 40° to 95° C.

As used herein, the term "dichloroethylenes" is meant to refer to 1,1-dichloroethylene which may contain cis-and/or trans-1,2-dichloroethylenes in various proportions and more particularly in an amount within the range of 20 to 70 molar per cent. It is preferred to make use of starting dichloroethylenes containing less than 0.1 percent by weight stabilizer. Dichloroethylenes containing up to 0.03 percent by weight stabilizer, such as phenol or p-methoxyphenol, can be used without interfering with the chlorination reaction.

In accordance with the practice of this invention, the solvent for the dichloroethylenes is selected from halogenated aliphatic hydrocarbons, such as 1,1,2,2-tetrachloroethane, pentachloro ethane and/or the other non-volatile solvents which are inert under the reaction conditions, such as 1,2-dichloroethane, hexachlorobutadiene and pentachlorofluoroethane. As the solvent, it is economical to make use of chlorinated compounds produced as a product of the process of this invention. Furthermore, dichloroethylenes can be introduced without dilution in the reaction medium or diluted by said solvent prior to their introduction.

As the catalyst, use can be made of a Lewis acid or preferably an iron halide, such as ferric chloride and/or iron which is converted to ferric chloride and/or iron oxychloride during the chlorination reaction of the dichloroethylenes.

It has been found that the amount of trichloroethylene and/or of pentachloroethane produced will increase with increase in the amount of catalyst used. Consequently the useful proportion of catalyst is equal to or above 0.008 percent by weight $FeCl_3$ and preferably within the range of 0.01 to 0.1 percent by weight $FeCl_3$ or equivalent, based upon the reaction liquid phase.

It has been found further that with catalyst concentrations greater than 0.008 percent by weight $FeCl_3$ or equivalent, light radiations have no influence on the kinetics or on the yield of the chlorination, whereby the mechanism of the latter becomes ionic. Thus the chlorination rate of 1,1-dichloroethylene is faster than that of the cis-and trans-1,2-dichloroethylenes and the formation of pentachloroethane is obtained by chlorination of trichloroethylene. Trichloroethylene orginates from the substitutive chlorination of 1,1-dichloroethylene and/or from the dehydrochlorination of 1,1,1,2-tetrachloroethane. The mechanism of the ionic chlorination can be represented schematically by the following equations:

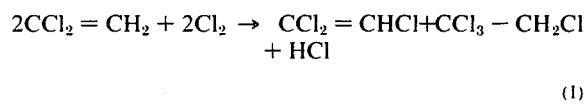

(I)

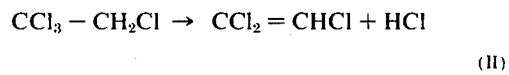

(II)

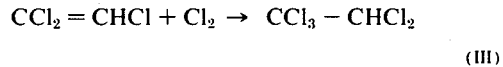

(III)

The molecular chlorine employed in the practice of this invention can be either in the form of liquid chlorine, which is gasified before reaction, or in the form of chlorine gas, which may be in the crude state as collected at the exit of chlorine production processes. It has been noticed that the yield of tetrachloroethanes into trichloroethylene and/or pentachloroethane does not vary whether use is made of 99.9 percent pure liquid chlorine or gaseous chlorine of 95 percent purity, the main impurities being $CO_2$, $O_2$, $N_2$, $H_2$ and $CO$. The chlorine employed in the practice of this invention can be diluted with an inert gas, that is to say gases which do not react under the conditions of the reaction, such as gases of the types described above as impurities. Chlorine dilution by inert gases in a ratio up to 1/1 is not detrimental to the reaction but it is disadvantageous to handle large volumes of inert gases since the productivity of the process would be decreased.

The molar ratio of chlorine-dichloroethylenes used is within the range of 0.3 to 3 but it is preferred to employ a molar ratio within the range of 0.6 to 2, from which high yields of unsymmetrical tetrachloroethane, trichloroethylene and pentachloroethane are obtained.

According to this invention, the residence time in the reactor may vary within the range of 2 to 25 hours and preferably 3 to 15 hours.

Furthermore, it has been established that for residence times ranging from 2 to 5 hours, mechanical agitation of the reaction medium is important to obtain good or even better yields of unsymmetrical tetrachloroethane, trichloroethylene and pentachloroethane. The role of agitation is minimal or negligible when longer residence reaction times are employed, such as more than 8 hours.

During the chlorination reaction, as many moles of hydrochloric acid are formed as moles of trichloroethylene and/or of pentachloroethane. The hydrochloric acid that is formed can be eliminated by any well known technique, such for example as by raising the temperature of the reaction medium, which has the effect of driving away the hydrochloric acid, or by stripping it off with chlorine gas and/or by inert gases such as $CO_2$, $O_2$, $N_2$, $H_2$ and $CO$, under the reaction conditions.

Pressure has the effect of promoting the formation of trichloroethylene and/or pentachloroethane provided the pressure does not exceed one bar. Pressures higher than one bar, such for example as pressures within the range of 3 to 10 bars, have the effect of driving the reaction toward the formation of 1,1,1-trichloroethane to the detriment of tetrachloroethanes, trichloroethylene and/or pentachloroethane. In effect, the hydrochloric acid, formed during the chlorination reaction, adds much more readily on to the 1,1-dichloroethylene in the presence of the catalyst to give 1,1,1-trichloroethane when the pressure is higher than one bar.

The following examples are given by way of illustration, but not by way of limitation, of the practice of this invention:

EXAMPLES 1 and 2

100 moles/hour of 99.9 percent pure 1,1-dichloroethylene, free of stabilizer, and 93 moles/hour of chlorine gas, derived from an electrolysis production unit at 95–97 percent purity, and variable amounts of ferric chloride are introduced continuously and at a temperature of 65° to 70° C, under agitation and at atmospheric pressure, into a reaction zone in the form of a glass reactor. The reaction is carried out in the absence of light. The residence time of the reactants in the reactor is 4 hours. The liquid phase which flows continuously from the reactor has a variable composition, as set forth in the following table. These results show that above a certain ferric chloride concentration in the reaction medium, close to 0.01 percent by weight, the composition of the liquid effluent from the reactor changes very little.

In contrast, the results of the comparative tests $a$, $b$ and $c$, which have been obtained with proportions of ferric chloride below 0.008 percent by weight, all other experimental conditions being the same as those of Examples 1 and 2, show that the composition of the effluent from the reactor is variable, depending upon the proportion of catalyst used.

|  | Examples 1 | 2 | Test a | Test b | Test c |
| --- | --- | --- | --- | --- | --- |
| Proportion of $FeCl_3$ catalyst in % by weight | 0.01 | 0.03 | 0.001 | 0.0025 | 0.006 |
| Composition of the reactor effluent expressed in molar per cent. | | | | | |
| 1,1,1,2-tetrachloro-ethane | 62.0 | 62.0 | 88.0 | 86.2 | 83.0 |
| trichloroethylene | 23.0 | 23.0 | <0.01 | 0.8 | 3.0 |
| pentachloroethane | 3.0 | 3.0 | 1.5 | 2.0 | 2.5 |
| 1,1,1-trichloroethane | 3.0 | 3.0 | <0.01 | 0.8 | 1.5 |
| 1,1-dichloroethylene | 8.5 | 8.5 | 10.0 | 9.7 | 9.5 |
| other heavier chlorinated products | 0.5 | 0.5 | 0.5 | 0.5 | 0.5 |
| Conversion rate of 1,1 dichloroethylene | 91.5 | 91.5 | 90 | 90.3 | 90.5 |

EXAMPLE 3

In an ordinary steel reactor (and in the absence of light), there are introduced with agitation, under atmospheric pressure, and at a temperature of 115° to 120° C, 100 moles/hour of a mixture free of stabilizer of 1,1-dichloroethylene and cis- and trans-1,2-dichloroethylene in the respective molar ratios 1/0, 7/0, 3 and 152 moles/hour of chlorine. The mixture as well as the chlorine are at 99.8 percent purity. The residence time of the reactants in the reactor is 8 hours and the conversion rate of the dichloroethylenes is close to 100 molar per cent. The reactor effluent contains 0.025 percent by weight ferric chloride, resulting from the attack on the reactor by the chlorine and the mixture brought into the system by the solvents. The effluent has the following molar composition:

| 1,1,2,2-tetrachloroethane | 50% |
| --- | --- |
| pentachlorethane | 48% |
| trichlorethylene | 2% |

Anhydrous gaseous hydrochloric acid, containing traces of chlorine, continuously escapes from the airhole condenser. The acid may be used directly, for instance, in organic synthesis, such as in oxychlorination, and hydrochlorination of $C_1$ to $C_4$ aliphatic hydrocarbons.

EXAMPLE 4

In an ordinary steel reactor, there is introduced at 55° to 60° C, under an absolute pressure of 600 mm Hg and in the absence of light, 100 moles/hour of a mixture containing 0.005 percent by weight phenol and in which the mixture is composed of:

| 50 molar per cent | 1,1-dichloroethylene |
| --- | --- |
| 30 molar per cent | trans-1,2-dichloroethylene |
| 20 molar per cent | cis-1,2-dichloroethylene | and 61 moles of chlorine at 99.8 percent purity. The residence time of the reactants in the reactor is 2 hours and the conversion rate of the mixture at the end of this time is 59 molar per cent. The conversion rate is purposely limited to 59 molar per cent with the aim toward maintaining an optimum proportion of trichloroethylene. The reaction medium contains from 0.0096 percent to 0.0135 percent by weight FeCl$_3$. The reactor effluent has the following composition in molar per cent:

| | |
|---|---|
| cis-and-trans-1,2-dichloroethylene | 41.0 |
| 1,1,1,2-tetrachloroethane | 36.4 |
| 1,1,2,2-tetrachloroethane | 9.0 |
| trichloroethylene | 13.4 |
| pentachloroethane | 0.2 |

Anhydrous gaseous hydrochloric acid, rich in chlorine, continuously escapes from the air-hole condenser due to the reaction temperature and its low solubility of 2 g/l in the reaction medium.

By way of comparison, Example 4 is reproduced but with a residence time of reactants in the reactor of 1.5 hours. The reactor effluent has the following molar composition:

| | |
|---|---|
| cis-and trans-1,2-dichloroethylene | 44.2% |
| 1,1,1,2-tetrachloroethane | 42.0% |
| 1,1,2,2-tetrachloroethane | 3.0% |
| trichloroethylene | 10.5% |
| pentachloroethane | 0.3% |

There is a loss of nearly 15 molar per cent of dichloroethylenes which are carried away by the chlorine gas which has not reacted. The conversion rate of the dichloroethylenes is only 48.6 percent.

EXAMPLE 5

In a steel reactor there are introduced in the absence of light, at a temperature of 40° C, and under an absolute pressure of 3 bars, 100 moles/hour of 1,1-dichloroethylene of 99.9 percent purity (free of stabilizer), 74 moles/hour of chlorine, and 5 g/hour of ferric chloride, which corresponds to 0.04 percent by weight. The residence time of the reactants in the reactor is 15 hours and the conversion rate of 1,1-dichloroethylene, at the end of this time, is 99.9 molar per cent. The organic products of the reactor effluent have the following composition, expressed in mole per cent:

| | |
|---|---|
| 1,1,1,2-tetrachloroethane | 49.7 |
| trichloroethylene | 26.3 |
| 1,1,1-trichloroethane | 23.6 |
| pentachloroethane and 1,1-dichloroethylene | 0.4 |

The use of higher pressure leads to the formation of a relatively important proportion of 1,1,1-trichloroethane through the utilization in situ of the hydrochloric acid that is formed.

EXAMPLE 6

Example 2 is reproduced by introducing into the reactor instead of 100 moles/hour of 1,1-dichloroethylene, 100 moles/hour of a mixture, free of stabilizer, containing 66.5 molar per cent of 1,1-dichloroethylene, 23.5 molar per cent of pentachloroethane, and 10 molar per cent of 1,1,2,2-tetrachloroethane. Chlorine is introduced in an amount corresponding to two-thirds that of Example 2. The molar composition of the liquid effluent is as follows:

| | |
|---|---|
| pentachloroethane | 25.5% |
| 1,1,2,2-tetrachlorethane | 10.0% |

-Continued

| | |
|---|---|
| 1,1,1,2-tetrachloroethane | 41.3% |
| trichloroethylene | 15.3% |
| 1,1,1-trichloroethane | 2.0 |
| 1,1-dichloroethylene | 5.5% |
| miscellaneous | 0.4% |

The conversion rate of the 1,1-dichloroethylene is 91.5 molar per cent and the yield of 1,1,1,2-tetrachloroethane is 67.8 molar per cent.

EXAMPLE 7

Example 2 is repeated with 1,1-dichloroethylene at 99.9 percent purity and in which the main impurity is phenol, which is present as a stabilizer in the amount of 0.03 percent by weight. The effluent from the reactor is a composition which is the same as that of Example 2.

It will be apparent from the foregoing that we have provided an efficient process for the simultaneous preparation of tetrachloroethanes, trichloroethylene and pentachloroethane by chlorination of dichloroethylene in the absence of light radiations.

It will be understood that changes may be made in the details of formulation and operation without departing from the spirit of the invention, especially as defined in the following claims.

We claim:

1. A process for the simultaneous preparation of tetrachloroethane, trichloroethylene, 1,1,1-trichloroethane and pentachloroethane by chlorination of dichloroethylenes selected from the group consisting of 1,1-dichloroethylene and a mixture of 1,1-dichloroethylene and 1,2-dichloroethylenes, comprising reacting the dichloroethylenes in a liquid solvent selected from the group consisting of 1,1,2,2-tetrachloroethane, pentachloroethane, 1,2-dichloroethane, hexachlorobutadiene and pentachlorofluoroethane with molecular chlorine in the presence of a Lewis acid catalyst in an amount within the range of 0.01 to 0.1 percent by weight based upon the weight of the reaction liquid, but in the absence of light at a temperature within the range of 25° to 120°C and a residence time within the range of 2 to 25 hours, wherein the molar ratio of chlorine to the dichloroethylenes is within the range of 0.3 to 3 and the starting dichloroethylenes contain less than 0.1 percent by weight of a stabilizer.

2. The process as claimed in claim 1 in which the reaction is carried out at a temperature within the range of 40° to 95° C.

3. The process as claimed in claim 1 in which the catalyst is ferric chloride.

4. The process as claimed in claim 1 in which the molecular proportion of chlorine to dichloroethylenes is within the range of 0.6 to 2.

5. The process as claimed in claim 1 in which the residence time of the reaction is within the range of 2 to 5 hours.

6. The process as claimed in claim 1 in which the reaction is carried out under pressure which does not exceed 1 bar.

7. The process as claimed in claim 1 in which the reaction is carried out at a pressure within the range of 3 to 10 bars.

8. The process as claimed in claim 1 in which the production of 1,1,1-trichloroethane is favored by carrying out the reaction above 1 bar.

9. The process as claimed in claim 1 in which the residence time of the reaction is within the range of 3 to 15 hours.

10. A process as claimed in claim 1 wherein the dichloroethylenes are a mixture of 1,1,-dichloroethylene and 1,2-dichloroethylene in which the 1,2-dichloroethylene constitutes 20-70 mole percent of the mixture.

11. A process for the simultaneous preparation of 1,1,1,2-tetrachloroethane, trichloroethylene and pentachloroethane by chlorination of dichloroethylenes selected from the group consisting of 1,1-dichloroethylene and a mixture of 1,1-dichloroethylene and 1,2-dichloroethylenes, comprising reacting the dichloroethylenes in a liquid solvent selected from the group consisting of 1,1,2,2-tetrachloroethane, pentachloroethane, 1,2-dichloroethane, hexachlorobutadiene and pentachlorofluoroethane with molecular chlorine in the presence of a Lewis acid catalyst in an amount within the range of 0.01 to 0.1 percent by weight based on the weight of the reaction liquid in the absence of light at a temperature within the range of 25° to 120°C and a pressure not exceeding 1 bar and a residence time within the range of 2 to 25 hours, wherein the molar ratio of chlorine to the dichloroethylenes is within the range of 0.3 to 3 and the starting dichloroethylenes contain less than 0.1 percent by weight of a stabilizer.

12. A process for the simultaneous preparation of 1,1,1,2-tetrachloroethane, trichloroethylene, 1,1,1-trichloroethane and pentachloroethane by chlorination of dichloroethylenes selected from the group consisting of 1,1-dichloroethylene and a mixture of 1,1-dichloroethylene and 1,2-dichloroethylenes, comprising reacting the dichloroethylenes in a liquid solvent selected from the group consisting of 1,1,2,2-tetrachloroethane, pentachloroethane, 1,2-dichloroethane, hexachlorobutadiene and pentachlorofluoroethane with molecular chlorine in the presence of a Lewis acid catalyst in an amount within the range of 0.01 to 0.1 percent by weight based upon the weight of the reaction liquid in the absence of light at a temperature within the range of 25° to 120°C and a pressure within the range of 3 to 10 bars and a residence time within the range of 2 to 25 hours, wherein the molar ratio of chlorine to the dichloroethylenes is within the range of 0.3 to 3 and the starting dichloroethylenes contain less than 0.1 percent by weight of a stabilizer.

* * * * *